United States Patent
Horisaki (10) Patent No.: US 10,097,249 B2
(45) Date of Patent: Oct. 9, 2018

(54) WIRELESS COMMUNICATION APPARATUS, WIRELESS COMMUNICATION SYSTEM, AND WIRELESS COMMUNICATION METHOD

(71) Applicant: KABUSHIKI KAISHA TOSHIBA, Tokyo (JP)

(72) Inventor: Koji Horisaki, Yokohama Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 86 days.

(21) Appl. No.: 15/218,797

(22) Filed: Jul. 25, 2016

(65) Prior Publication Data

US 2017/0070270 A1 Mar. 9, 2017

(30) Foreign Application Priority Data

Sep. 9, 2015 (JP) ................................. 2015-177591

(51) Int. Cl.
*H04B 7/0452* (2017.01)
*H04B 17/318* (2015.01)
*H04B 17/10* (2015.01)
*H04L 1/18* (2006.01)
*H04L 1/16* (2006.01)
*H04L 1/00* (2006.01)

(52) U.S. Cl.
CPC ......... *H04B 7/0452* (2013.01); *H04B 17/103* (2015.01); *H04B 17/318* (2015.01); *H04L 1/1692* (2013.01); *H04L 1/1867* (2013.01); H04L 1/1685 (2013.01); H04L 2001/0093 (2013.01)

(58) Field of Classification Search
CPC .. H04B 7/0452; H04B 17/103; H04B 17/318; H04L 1/1692; H04L 1/1867; H04L 1/1685; H04L 2001/0093
See application file for complete search history.

(56) References Cited

U.S. PATENT DOCUMENTS

| 8,687,546 | B2 | 4/2014 | Gong et al. |
| 8,929,286 | B2 | 1/2015 | Morioka et al. |
| 9,137,815 | B2 | 9/2015 | Sampath et al. |
| 2010/0023828 | A1* | 1/2010 | Weinman ............ H04L 12/1868 714/748 |
| 2011/0216688 | A1* | 9/2011 | Katori ................. H04W 72/005 370/312 |
| 2013/0028154 | A1* | 1/2013 | Matsuo ................ H04L 1/1685 370/310 |

(Continued)

FOREIGN PATENT DOCUMENTS

| JP | 2012531105 A | 12/2012 |
| JP | 2013516142 A | 5/2013 |
| JP | 2014212579 A | 11/2014 |

*Primary Examiner* — Jae Y Lee
(74) *Attorney, Agent, or Firm* — Patterson & Sheridan, LLP (57) ABSTRACT

A wireless communication apparatus includes a plurality of antennas, and a controller configured to cause a multicast frame including distribution data and a return request to be transmitted from the antennas, and the multicast frame to be re-transmitted when the antennas receive one or more return frames as a response to the multicast frame and an intensity of the return frames meets a predetermined condition.

17 Claims, 9 Drawing Sheets (56) References Cited

U.S. PATENT DOCUMENTS

| | | | |
|---|---|---|---|
| 2015/0043414 A1* | 2/2015 | Han | H04W 72/005 370/312 |
| 2016/0029386 A1 | 1/2016 | Sekiya | |
| 2017/0063562 A1* | 3/2017 | Cariou | H04L 12/189 |

* cited by examiner

WIRELESS COMMUNICATION APPARATUS, WIRELESS COMMUNICATION SYSTEM, AND WIRELESS COMMUNICATION METHOD

CROSS-REFERENCE TO RELATED APPLICATION

This application is based upon and claims the benefit of priority from Japanese Patent Application No. 2015-177591, filed Sep. 9, 2015, the entire contents of which are incorporated herein by reference.

FIELD

Embodiments described herein relate generally to a wireless communication apparatus, a wireless communication system, and a wireless communication method.

BACKGROUND

Generally, in uplink multi-user multiple input multiple output (UL-MU-MIMO) communication, a plurality of slave stations is able to simultaneously transmit a frame to a master station, using the same frequency. Further, in wireless communication of a multicast system, the master station can broadcast the same frame to a plurality of slave stations.

However, it takes time to perform a preliminary handshake before starting the transmission of frames, in the UL-MU-MIMO communication. Further, it is difficult to check success or failure of reception of the frames by the master station and to ensure reliability of the communication, in the case of a multicast.

DETAILED DESCRIPTION

One or more embodiments provide a wireless communication apparatus, a wireless communication system, and a wireless communication method, which are capable of improving a communication speed and reliability of communication.

In general, according to one embodiment, a wireless communication apparatus includes a plurality of antennas, and a controller configured to cause a multicast frame including distribution data and a return request to be transmitted from the antennas, and the multicast frame to be re-transmitted when the antennas receive one or more return frames as a response to the multicast frame and an intensity of the return frames meets a predetermined condition.

Embodiments are described with reference to the drawings. The embodiments are not intended to limit the present invention.

First Embodiment

Figure 1:
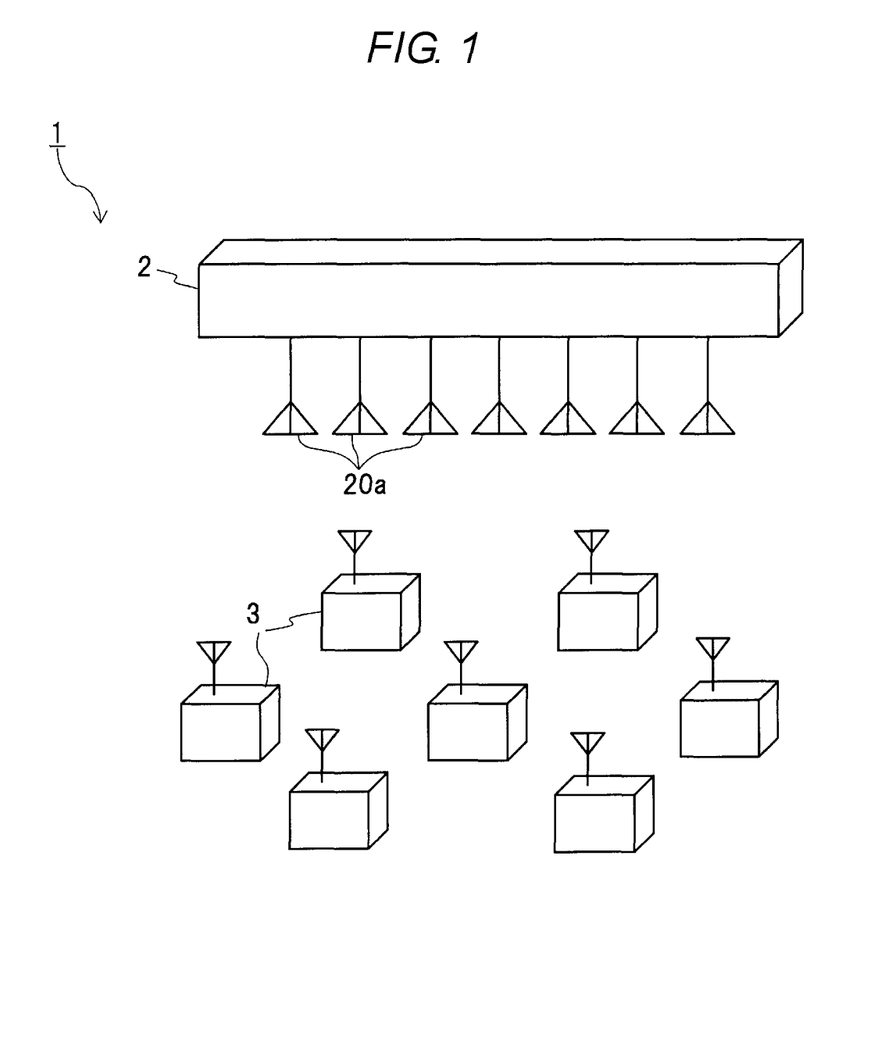
FIG. 1 is a block diagram of a wireless communication system according to a first embodiment.

FIG. 1 is a block diagram of a wireless communication system 1 according to a first embodiment. As illustrated in FIG. 1, the wireless communication system 1 according to the first embodiment includes a first wireless communication apparatus 2, and a plurality of second wireless communication apparatuses 3. The first wireless communication apparatus 2 and each second wireless communication apparatus 3 perform, for example, wireless communication by a wireless LAN communication system conforming to IEEE 802.11, IEEE802.11ax, or the like.

For example, the first wireless communication apparatus 2 is an access point (AP) of wireless LAN, that is, a wireless base station, and the second wireless communication apparatus 3 is a wireless terminal of wireless LAN, that is, a station (i.e., a STA). For example, the first wireless communication apparatus 2 and each second wireless communication apparatus 3 form a network of a wireless LAN of an infrastructure mode, including one wireless base station and a plurality of wireless terminals. In addition, the first wireless communication apparatus 2 and each second wireless communication apparatus 3 may form a wireless LAN network operating in an ad hoc mode in which wireless terminals directly communicate with each other, without passing through the wireless base station. Further, the first wireless communication apparatus 2 may form a wireless distribution system (WDS) network in which wireless base stations communicate with each other.

The first wireless communication apparatus 2 is provided with a plurality of antennas 20a of the same number or more as the number of second wireless communication apparatuses 3. The first wireless communication apparatus 2 transmits a first multicast frame, using at least one antenna 20a, at a first frequency, in other words, at the same frequency, simultaneously, in other words, all at once, to each of the second wireless communication apparatuses 3. The first multicast frame includes first data, which is designated to the respective second wireless communication apparatuses 3 as a destination, in other words, having a multicast address, and NACK request flag to request a negative acknowledgment (NACK) from each of the second wireless communication apparatuses 3. In addition, the first multicast frame is an example of the first frame. The NACK request flag is an example of request for a response from each of the second wireless communication apparatuses 3.

The first wireless communication apparatus 2 is capable of collectively receiving a NACK frame to respond to the NACK request flag from each of the second wireless communication apparatuses 3, at a second frequency, in other words, at the same frequency, using each antenna 20a. Here, the second frequency may or may not be the same as the first frequency. In addition, the NACK frame is an example of the second frame. The first wireless communication apparatus 2 is capable of receiving a NACK frame from each of the second wireless communication apparatuses 3 in wireless communication of a UL-MU-MIMO system. In other words, the first wireless communication apparatus 2 is capable of receiving concurrently the NACK frame for each of the second wireless communication apparatuses 3 through spatial multiplexing.

Figure 2:
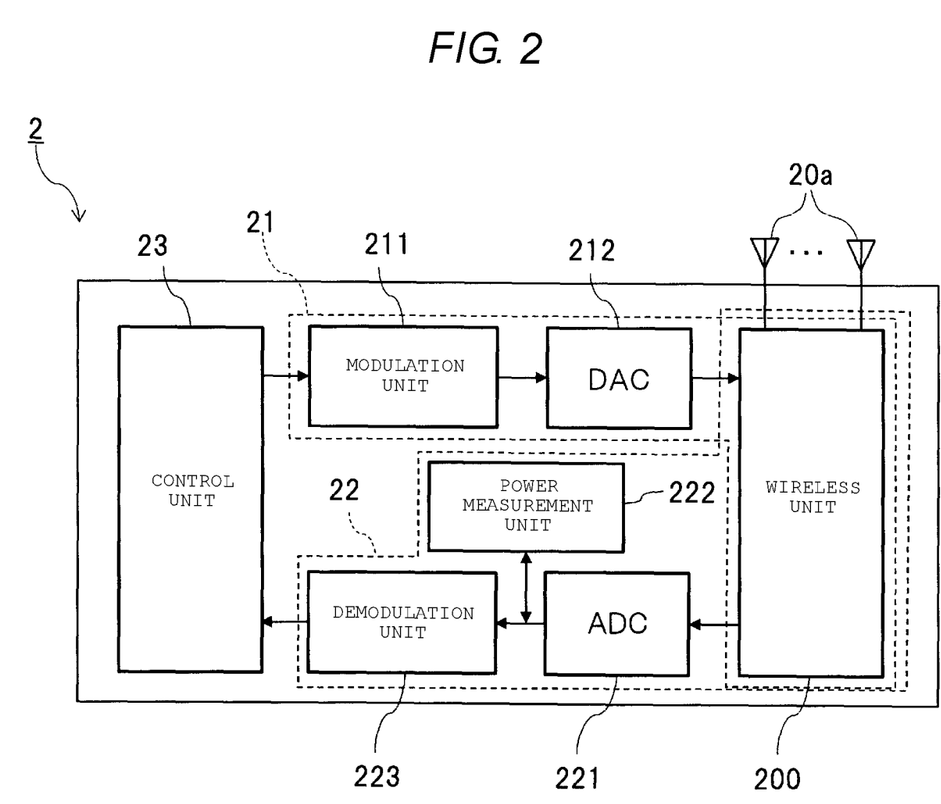
FIG. 2 is a block diagram of a first wireless communication apparatus according to the first embodiment.

FIG. 2 is a block diagram of the first wireless communication apparatus 2 according to the first embodiment. As illustrated in FIG. 2, the first wireless communication apparatus 2 includes a transmission unit 21, a reception unit 22, and a control unit 23.

The transmission unit 21 includes a modulation unit 211, a digital to analog converter (DAC) 212, and a wireless unit 200, in order from the upstream side in the flow of transmission data. The modulation unit 211 is arranged after the control unit 23. The wireless unit 200 is provided with each antenna 20a. The wireless unit 200 is a common element of the transmission unit 21 and the reception unit 22.

The reception unit 22 includes a wireless unit 200, an analog to digital converter (ADC) 221, a power measurement unit 222, and a demodulation unit 223, in order from the upstream side in the flow of reception data. The demodulation unit 223 is arranged in front of the control unit 23.

In addition, the second wireless communication apparatus 3 may also have the same elements as the first wireless communication apparatus 2.

The transmission unit 21 transmits the first multicast frame to each of the second wireless communication apparatuses (i.e., STAs) 3, at the first frequency, simultaneously, using each antenna 20a.

Specifically, the control unit 23 generates the first multicast frame, and outputs the generated first multicast frame to the modulation unit 211. The modulation unit 211 performs a transmission process including a predetermined modulation process and coding process conforming to IEEE802.11 on the first multicast frame that is output from the control unit 23. The transmission process may include, for example, an error correction coding process, an interleave process, an inverse fast Fourier transform (IFFT) process, or the like. The modulation unit 211 outputs the first multicast frame subjected to the transmission process to the DAC 212. The DAC 212 converts the first multicast frame that is output from the modulation unit 211, from the digital signal to an analog baseband signal. The DAC 212 outputs the first multicast frame that is converted to the analog signal, to the wireless unit 200. The wireless unit 200 up-converts the baseband signal of the first multicast frame that is output from the DAC 212 at the first frequency. The wireless unit 200 transmits the baseband signal of the up-converted first multicast frame from the antenna 20a to the second wireless communication apparatus 3.

The reception unit 22 is capable of receiving a NACK frame to respond to the NACK request flag of the first multicast frame from each of the second wireless communication apparatuses 3, at the second frequency, using each antenna 20a.

Specifically, the wireless unit 200 receives the NACK frame transmitted from the second wireless communication apparatus 3 at the second frequency, using the antenna 20a. The second frequency is, for example, equal to the first frequency. The wireless unit 200 down-converts the received NACK frame. The wireless unit 200 outputs the down-converted NACK frame to the ADC 221. The ADC 221 converts the NACK frame that is output from the wireless unit 200, to a digital signal. The ADC 221 outputs the NACK frame that is converted to the digital signal, to the demodulation unit 223. The demodulation unit 223 performs a reception process including a predetermined demodulation process and decoding process conforming to IEEE802.11 on the NACK frame that is output from the ADC 221. The reception process may include, for example, an orthogonal frequency-division multiplexing (OFDM) symbol timing synchronization process, a fast Fourier transform (FFT) process, a de-interleave process, an error correction decoding process, or the like. The demodulation unit 223 outputs the NACK frame subjected to the reception process, to the control unit 23.

The control unit 23 controls the transmission unit 21 so as to retransmit the first data corresponding to the reception state of the NACK frame.

Specifically, the power measurement unit 222 measures the reception power of the NACK frame, as the reception state of the NACK frame. When the first time elapses from the transmission of the first multicast frame, if the power measurement unit 222 detects received power greater than a threshold, the control unit 23 controls the transmission unit 21 so as to retransmit the first multicast frame as the first data retransmission. For example, the control unit 23 regenerates the first multicast frame, and outputs the regenerated first multicast frame to the modulation unit 211. In addition, a time when the first time elapses from the transmission of the first multicast frame can be referred to as an expected time when the NACK frame is to be received. The power measurement unit 222 may be an automatic gain control (AGC) circuit.

When the first time elapses from the transmission of the first multicast frame, if the power measurement unit 222 detects received power below a threshold, the control unit 23 controls the transmission unit 21 so as to transmit a first unicast frame as the first data retransmission. The first unicast frame includes first data designated to one second wireless communication apparatus 3 that returned the NACK frame as a destination, among a plurality of second wireless communication apparatuses 3, and a NACK request flag to request negative acknowledgement from the one second wireless communication apparatus 3. When there are two or more second wireless communication apparatuses 3 that returned the NACK frame, the control unit 23 performs control for transmitting the first unicast frame sequentially to the two or more second wireless communication apparatuses 3. In addition, the first unicast frame is an example of a third frame. When transmitting the first unicast frame, the control unit 23 generates the first unicast frame, and outputs the generated first unicast frame to the modulation unit 211. After the first unicast frame is processed sequentially by the modulation unit 211, the DAC 212 and the wireless unit 200, the transmission unit 21 transmits the first unicast frame to the second wireless communication apparatus 3 that returned the NACK frame.

In addition, the first unicast frame may include ACK request flag to request acknowledgement (ACK) from the second wireless communication apparatus 3, in addition to the NACK request flag, or instead of the NACK request flag.

When the first time elapses from the retransmission of the first multicast frame, if the power measurement unit 222 receives power less than a threshold, the control unit 23 controls the transmission unit 21 so as to transmit the first unicast frame.

When the first wireless communication apparatus 2 transmits only the unicast frame to a plurality of second wireless communication apparatuses 3, when the first wireless communication apparatus 2 does not receive the response frame from the first one of the second wireless communication apparatuses 3 after transmitting the unicast frame to the first one of the second wireless communication apparatuses 3, the first wireless communication apparatus 2 cannot transmit the unicast frame to the second one of the second wireless communication apparatuses 3. Thus, since it takes time for the preliminary handshake to start the transmission of frames, the communication speed becomes slower.

In contrast, in the first embodiment, it is possible to collectively transmit the first multicast frame to the plurality of second wireless communication apparatuses 3 in a multicast manner, and to concurrently receive the NACK frame in a UL-MU-MIMO manner, from the second wireless communication apparatuses 3 which fail in receiving the first multicast frame. Thus, it is possible to reduce the time for handshake, and check the success or failure of the reception. Therefore, according to the wireless communication system 1 of the first embodiment, it is possible to improve the communication speed and the reliability of communication.

When the NACK frames are received from a large number of second wireless communication apparatuses 3, if the first data is retransmitted to the second wireless communication apparatus 3 which returned the NACK frame in a unicast manner, it takes time for the handshake and it is difficult to correctly determine the second wireless communication apparatus 3 which returned the NACK frame. As a result, it becomes difficult to quickly and reliably retransmit the first data to the second wireless communication apparatus 3 that returned the NACK frame.

Figure 3A:
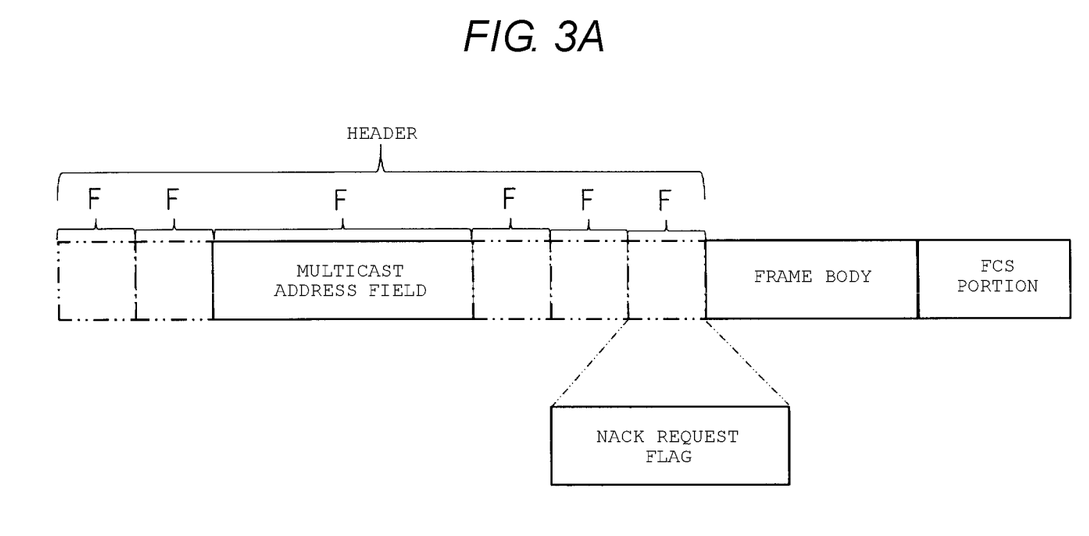
FIG. 3A schematically illustrates a first multicast frame that is transmitted in the wireless communication system according to the first embodiment, and FIG. 3B schematically illustrates a first unicast frame.
Figure 3B:
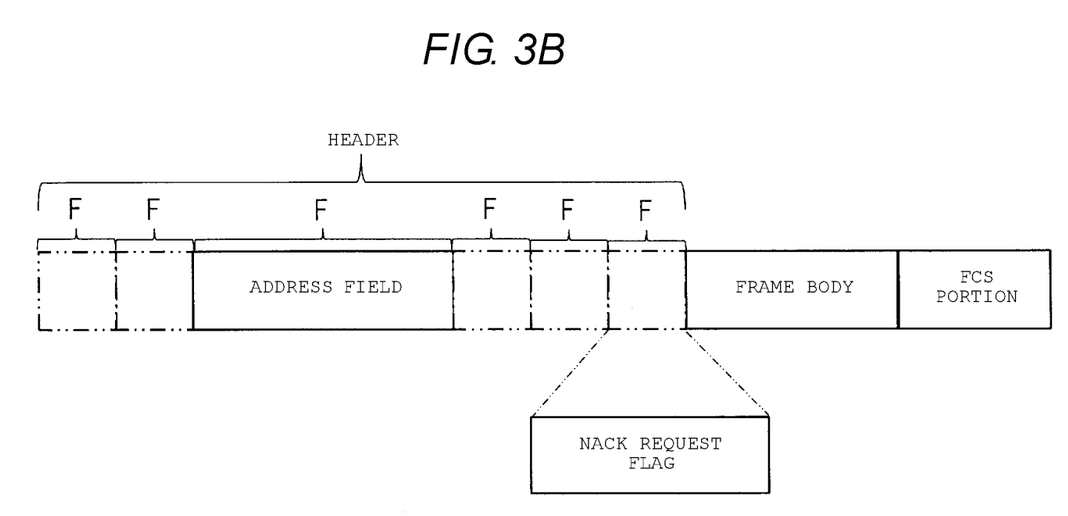

In contrast, in the first embodiment, if reception power is large when the first time elapses from the transmission of the first multicast frame, it is possible to retransmit the first multicast frame to all of the second wireless communication apparatuses 3 in the network. Therefore, according to the wireless communication system 1 according to the first embodiment, it is possible to improve the communication speed and the reliability of communication. Wireless communication method Next, the operation example of the wireless communication system 1 is described as an example of a wireless communication method according to the first embodiment. FIG. 3A is a schematic diagram of a first multicast frame that is transmitted in the wireless communication system 1 according to the first embodiment. FIG. 3B is a schematic diagram of a first unicast frame that is transmitted in the wireless communication system 1.

As illustrated in FIG. 3A, the first multicast frame has, for example, a header, a frame body, and a frame check sequence (FCS) portion. The header has a plurality of fields F, and one of them is a multicast address field. The addresses, in other words, the multicast addresses of a plurality of second wireless communication apparatuses 3 are stored in the multicast address field. First data is stored in the frame body. A cyclic redundancy code (CRC) for determining whether the first data is successfully received is stored in the FCS portion. In addition, for the first multicast frame, for example, each second wireless communication apparatus 3 may be designated as a destination in a manner of a destination group, instead of designating each second wireless communication apparatus 3 as a destination in a manner of the multicast address.

A NACK request flag which is an example of the NACK request flag is stored in a predetermined field F in the header. For example, when a NACK frame is requested, the flag has a value of "1"; and when the NACK frame is not requested, the flag has a value of "0". The field F storing the NACK request flag is not particularly limited. For example, the NACK request flag may be stored in the sequence control field or the like.

As illustrated in FIG. 3B, the first unicast frame has an address field storing the address of a single second wireless communication apparatus 3 in the header. The other configurations may be the same as the first multicast frame.

Figure 4:
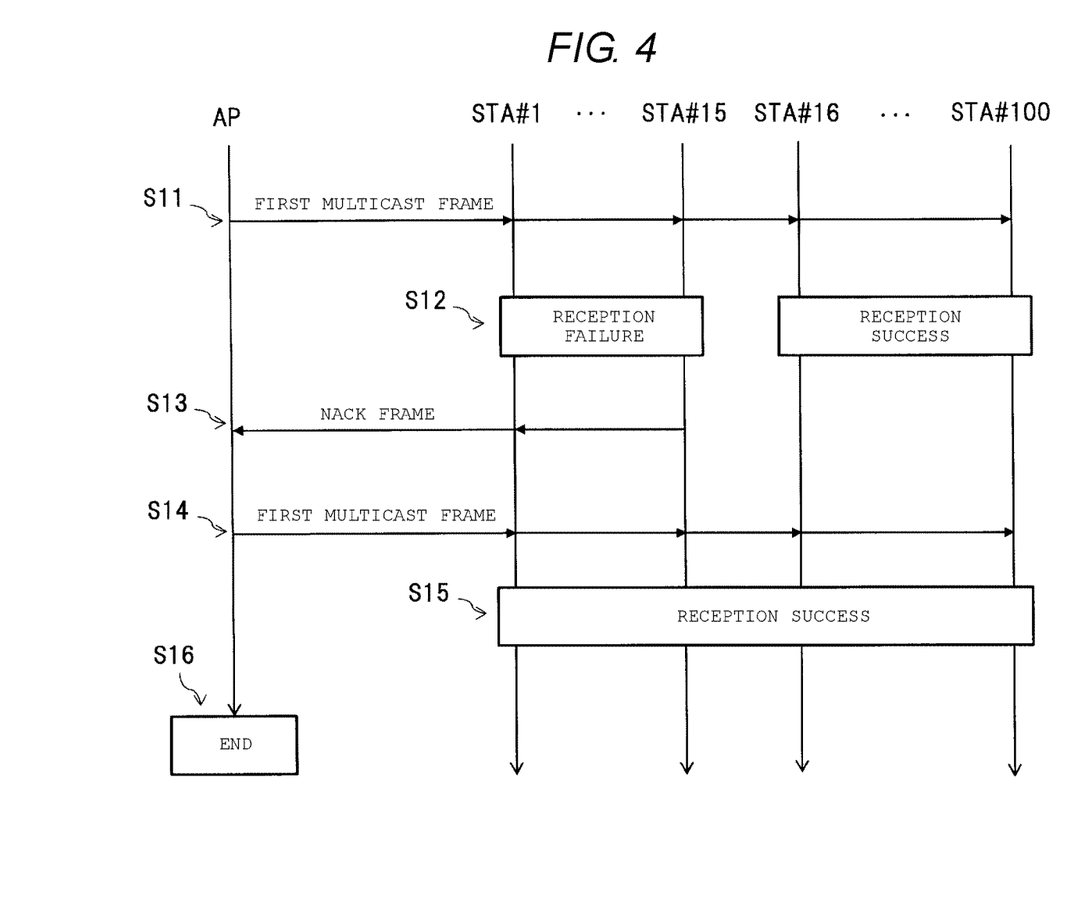
FIG. 4 is a sequence diagram illustrating a first operation example of the wireless communication system according to the first embodiment.

FIG. 4 is a sequence diagram illustrating a first operation example of the wireless communication system 1 according to the first embodiment. Hereinafter, a wireless communication method when there are many NACK responses is described with reference to FIG. 4. In FIG. 4, an access point (AP) is illustrated as an example of the first wireless communication apparatus 2, and the first to 100-th stations (STA#1 to #100) in the network of the access point are illustrated as an example of the plurality of second wireless communication apparatuses 3.

First, the access point simultaneously transmits the first multicast frame to all of the stations #1 to #100 at the first frequency (step S11).

Next, the first to fifteenth stations #1 to #15 fail in reception, in other words, demodulation of the first data in the first multicast frame, and the sixteenth to 100-th station #16 to #100 succeed in receiving the first data (step S12).

Next, the first to fifteenth stations #1 to #15 that fail in reception of the first data transmit a NACK frame to the access point (step S13).

Next, the access point simultaneously retransmits the first multicast frame (step S14) to all of the stations #1 to #100 at the first frequency, based on the fact that power of a threshold or more is received when the first time elapses from the transmission of the first multicast frame in step S11.

Next, all of the stations #1 to #100 succeed in receiving the first data (step S15), and thus the access point ends the process (step S16). At this time, the access point may determine whether the first data is successfully received, based on the fact that power of a threshold or more is not received when the first time elapses from the retransmission of the first multicast frame in step S14.

Figure 5:
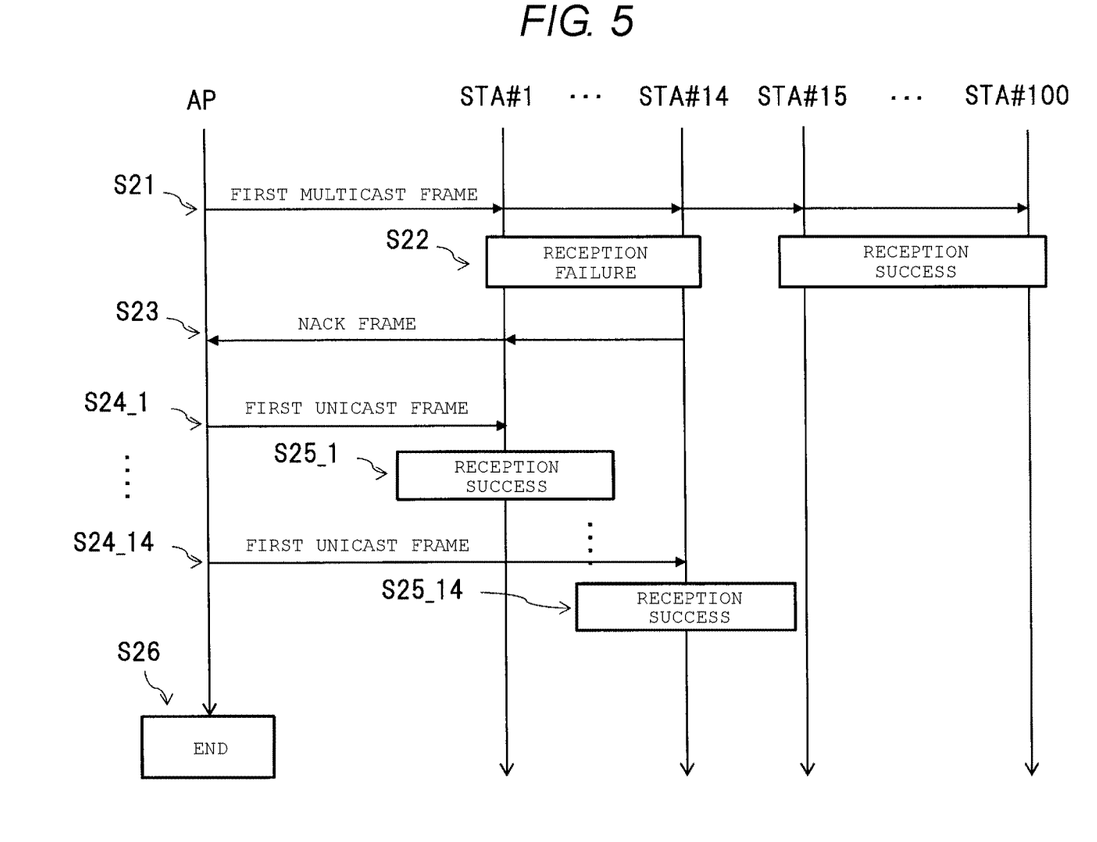
FIG. 5 is a sequence diagram illustrating a second operation example of the wireless communication system according to the first embodiment.

FIG. 5 is a sequence diagram illustrating a second operation example of the wireless communication system 1 according to the first embodiment. A wireless communication method when there are fewer NACK responses is described with reference to FIG. 5.

First, the access point simultaneously transmits the first multicast frame to all of the stations #1 to #100 at the first frequency (step S21).

Next, the first to fourteenth stations #1 to #14 fail in reception of the first data, and the fifteenth to 100-th station #15 to #100 succeed in receiving the first data (step S22).

Next, the first to fourteenth stations #1 to #14 that fail in reception of the first data transmit a NACK frame to the access point (step S23).

Next, the access point sequentially transmits the first unicast frame to the first to fourteenth stations #1 to #14, (step S24_1 to step 24_14) based on the fact that power less than the threshold is received when the first time elapses from the transmission of the first multicast frame in step S21. In the process of sequentially transmitting the first unicast frame to the stations #1 to #14, the stations #1 to #14 sequentially succeed in receiving the first data (step S25_1 to step S25_14). If the stations #1 to #14 succeed in the reception, the access point ends the process (step S26).

Figure 6:
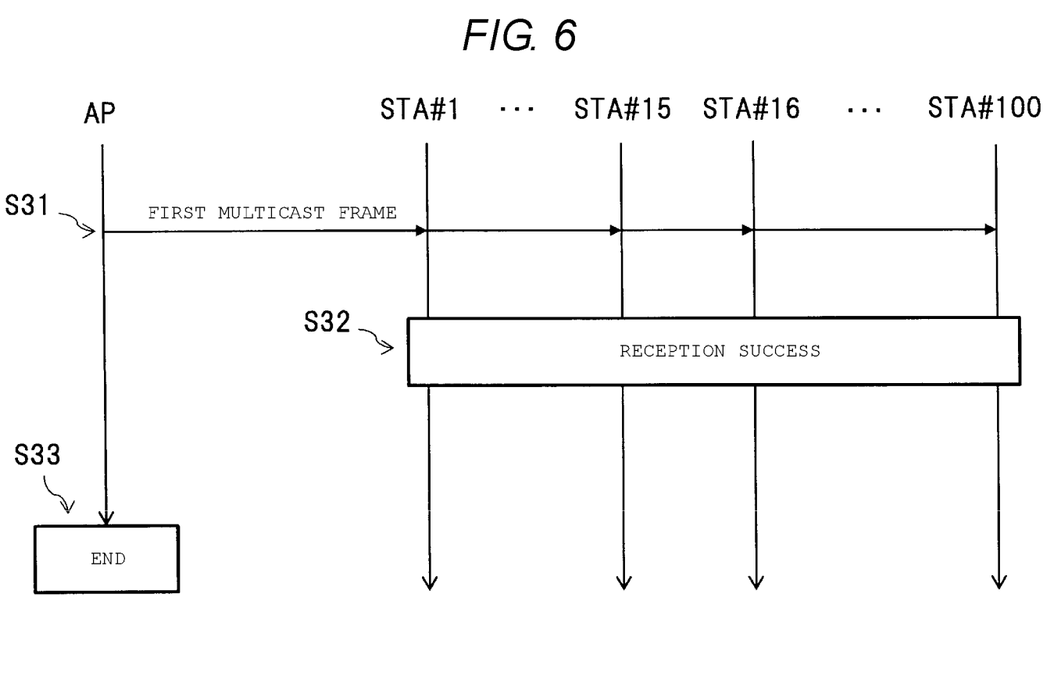
FIG. 6 is a sequence diagram illustrating a third operation example of the wireless communication system according to the first embodiment.

FIG. 6 is a sequence diagram illustrating a third operation example of the wireless communication system 1 according to the first embodiment. A wireless communication method when there are no NACK responses is described with reference to FIG. 6.

First, the access point simultaneously transmits the first multicast frame to all of the stations #1 to #100 at the first frequency (step S31).

Next, all of the stations #1 to #100 succeed in receiving the first data (step S32), and thus, the access point ends the process (step S33). At this time, the access point transmits neither the first multicast frame nor the first unicast frame.

Figure 7:
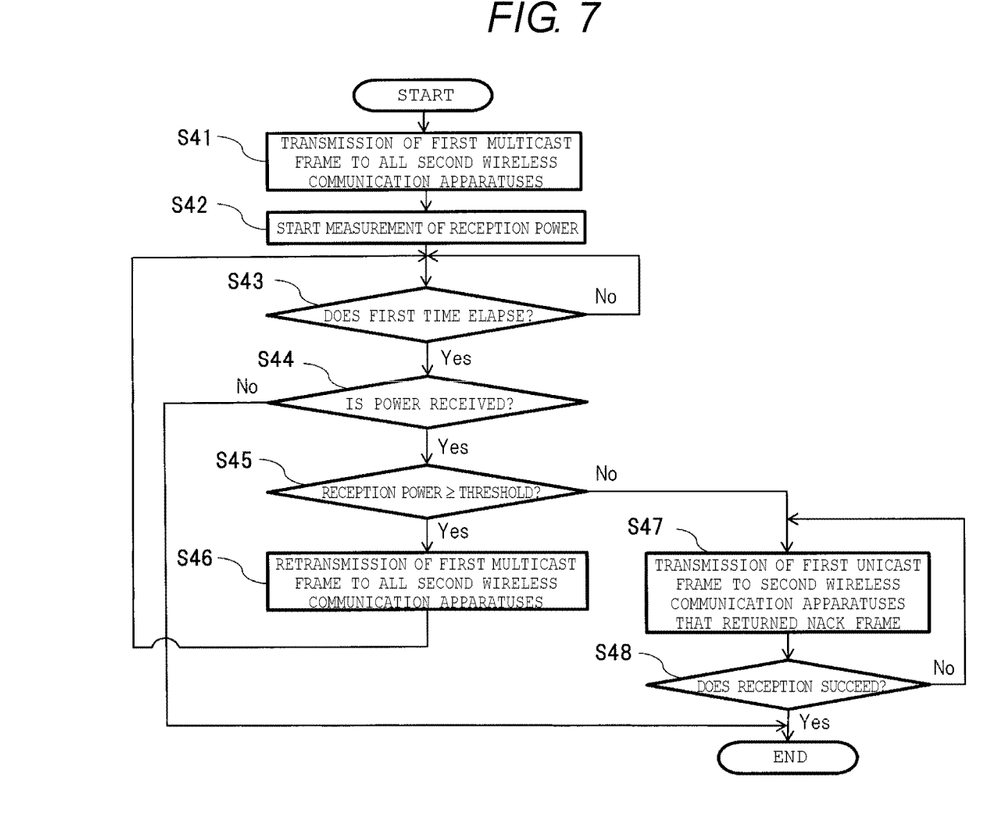
FIG. 7 is a flowchart illustrating an operation example of the first wireless communication apparatus according to the first embodiment.

FIG. 7 is a flowchart illustrating an operation example of the first wireless communication apparatus 2 according to the first embodiment. Next, the detailed operation example of the first wireless communication apparatus 2 is described with reference to FIG. 7.

First, the transmission unit 21 simultaneously transmits the first multicast frame to all of the second wireless communication apparatuses 3 in the network of the first wireless communication apparatus 2, at the first frequency, using at least one antenna 20a (step S41).

Next, the power measurement unit 222 starts the measurement of the reception power (step S42).

Next, the control unit 23 determines whether or not first time elapses from the transmission of the first multicast frame (step S43).

When the first time elapses (step S43: Yes), the control unit 23 determines whether or not the power measurement unit 222 receives power (step S44). When the first time does not elapse (step S43: NO), the control unit 23 repeats the determination (step S43).

Next, when power measurement unit 222 receives power (step S44: Yes), the control unit 23 determines whether or not the reception power is greater than or equal to the threshold (step S45). When the power measurement unit 222 does not receive power (step S44: No), the control unit 23 ends the process.

If the reception power is greater than or equal to the threshold (step S45: Yes), the control unit 23 controls the transmission unit 21 so as to retransmit the first multicast frame to all of the second wireless communication apparatuses 3 (step S46). Thereafter, the determination (step S43) as to whether the first time elapses from the transmission (retransmission) of the first multicast frame and the subsequent processes are repeated.

When the reception power is less than the threshold (step S45: No), the control unit 23 controls the transmission unit 21 so as to transmit the first unicast frame to the second wireless communication apparatuses 3 that returned the NACK frame (step S47).

Next, the control unit 23 determines whether or not all of the second wireless communication apparatuses 3 that transmit the first unicast frame successfully receive the first data (step S48). The control unit 23 determines that reception is successful, based on the fact that the NACK frame is not returned when the first time elapses from the transmission of the first unicast frame. The control unit 23 may determine that reception is successful, based on the fact that the ACK frame is returned when the first time elapses from the transmission of the first unicast frame.

When all of the second wireless communication apparatuses 3 that transmit the first unicast frame succeed in receiving the first data (step S48: Yes), the control unit ends the process. When there is a second wireless communication apparatus 3 that fails in receiving the first data, in other words, the second wireless communication apparatus 3 again returns the NACK frame, the control unit 23 transmits the first unicast frame to the second wireless communication apparatus 3 that fails in receiving the first data (step S47).

As described above, according to the first embodiment, the first multicast frame is transmitted from the first wireless communication apparatus 2 to the plurality of second wireless communication apparatuses 3, and the first multicast frame is retransmitted to each second wireless communication apparatus 3 depending on the reception state of the NACK frame returned from the second wireless communication apparatus 3, such that it is possible to improve the communication speed and the reliability of communication.

Second Embodiment

Next, as a second embodiment, an embodiment of the wireless communication system 1 that transmits the first data is described. In addition, in the second embodiment, the same reference numerals are used for the elements corresponding to the first embodiment, and thus a description is not repeated.

Figure 8:
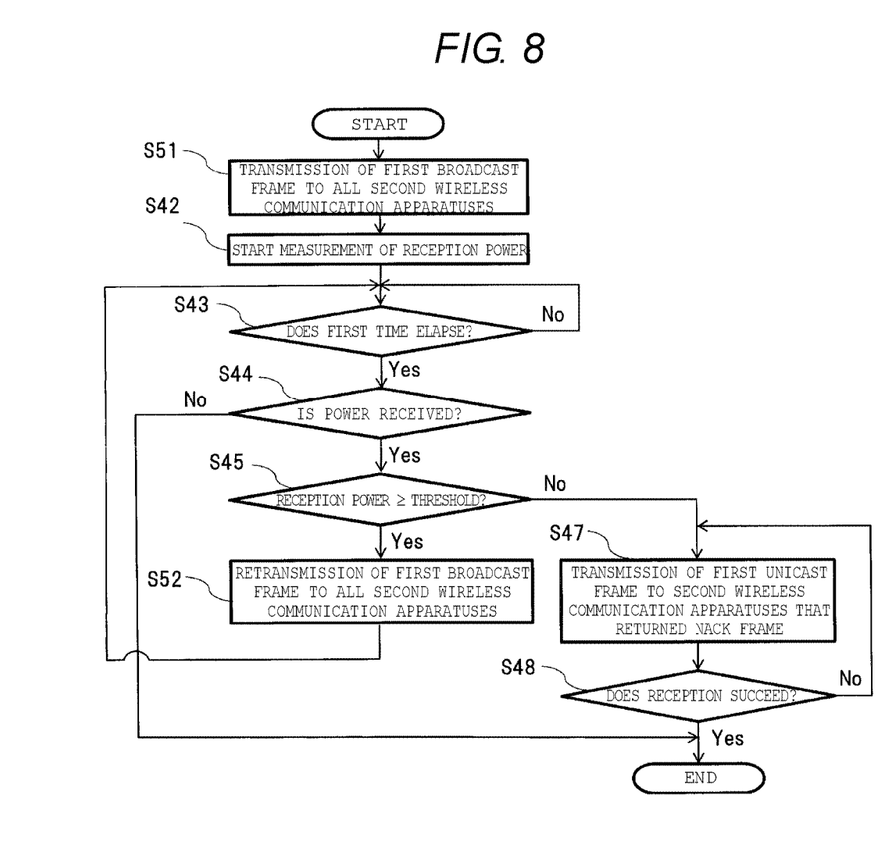
FIG. 8 is a flowchart illustrating an operation example of a first wireless communication apparatus according to a second embodiment.

FIG. 8 is a flowchart illustrating an operation example of a first wireless communication apparatus 2 according to the second embodiment. As illustrated in FIG. 8, the transmission unit 21 transmits a first broadcast frame to all of the second wireless communication apparatuses 3 in the network (step S51), instead of transmitting the first multicast frame to all of the second wireless communication apparatuses 3 in the network (step S41 in FIG. 7). The first broadcast frame includes first data which is designated to all of the second wireless communication apparatuses 3 in a network as a destination, in other words, having a broadcast address, and NACK request flag.

In the transmission of the first broadcast frame, the control unit 23 generates the first broadcast frame, and outputs the generated first broadcast frame to the modulation unit 211. The modulation unit 211 performs a transmission process including a predetermined modulation process and coding process conforming to IEEE802.11 on the first broadcast frame that is output from the control unit 23. The modulation unit 211 outputs the first broadcast frame subjected to the transmission process to the DAC 212. The DAC 212 converts the first broadcast frame that is output from the modulation unit 211, from the digital signal to an analog baseband signal. The DAC 212 outputs the first broadcast frame that is converted to the analog signal, to the wireless unit 200. The wireless unit 200 up-converts the baseband signal of the first broadcast frame that is output from the DAC 212 at the first frequency. The wireless unit 200 transmits the baseband signal of the up-converted first broadcast frame from the antenna 20a to the second wireless communication apparatus 3.

Further, as illustrated in FIG. 8, in the second embodiment, the control unit 23 retransmits a first broadcast frame to all of the second wireless communication apparatuses 3 (step S52), instead of transmitting the first multicast frame to all of the second wireless communication apparatuses 3 (step S46 in FIG. 7).

According to the second embodiment, the first broadcast frame is transmitted from the first wireless communication apparatus 2 to the plurality of second wireless communication apparatuses 3, and the first broadcast frame is retransmitted to each of the second wireless communication apparatuses 3 depending on the reception state of the NACK frame from the second wireless communication apparatus 3, such that it is possible to improve the communication speed and the reliability of communication.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A wireless communication device, comprising:
a plurality of antennas; and
a controller configured to
cause a multicast frame including distribution data and a return request to be transmitted from the antennas, and the multicast frame to be re-transmitted when the antennas receive return frames as a response to the multicast frame and an intensity of the return frames meets a predetermined condition, and
cause a unicast frame including the distribution data, the return request and an address of a single target receiving device, to be transmitted to the single target receiving device, when the antennas receive the return frames and the intensity of the return frames does not meet the predetermined condition.

2. The wireless communication device according to claim 1, wherein
the return request causes a receiving device to transmit the return frame when the receiving device fails to demodulate the distribution data in the multicast frame.

3. The wireless communication device according to claim 1, wherein
the predetermined condition is met when the intensity of the return frames is greater than a predetermined level.

4. The wireless communication device according to claim 3, wherein
the controller is configured to measure the intensity of the return frames after a predetermined period of time from the transmission of the multicast frame.

5. The wireless communication device according to claim 1, wherein
the multicast frame includes an address of each of a plurality of target receiving devices.

6. The wireless communication device according to claim 1, wherein
the target receiving devices are all receiving devices within a wireless communication network established with the wireless communication device.

7. The wireless communication device according to claim 1, wherein the controller is further configured to cause the unicast frame to be transmitted from one of the antennas.

8. The wireless communication device according to claim 1, wherein
when the intensity of the return frames meets the predetermined condition, the controller causes a plurality of unicast frames to be transmitted sequentially to each of receiving devices that returned a negative acknowledgement within the return frame.

9. A wireless communication system, comprising:
a wireless communication device that transmits a multicast frame and a unicast frame; and
a plurality of wireless communication receiving devices, wherein
the wireless communication device includes:
a plurality of antennas; and
a controller configured to
cause the multicast frame, which includes distribution data and a return request, to be transmitted from the antennas, and the multicast frame to be re-transmitted when the antennas receive return frames from the wireless communication receiving devices as a response to the multicast frame and an intensity of the return frames meets a predetermined condition, and
cause the unicast frame including the distribution data, the return request and an address of a single target receiving device, to be transmitted to the single target receiving device, when the antennas receive the return frames and the intensity of the return frames does not meet the predetermined condition.

10. The wireless communication system according to claim 9, wherein
the return request causes each of the wireless communication receiving devices to transmit the return frame when said each of the wireless communication receiving devices fails to demodulate the distribution data in the multicast frame.

11. The wireless communication system according to claim 9, wherein
the predetermined condition is met when the intensity of the return frames is greater than a predetermined level.

12. The wireless communication system according to claim 9, wherein
the controller is configured to measure the intensity of the return frames after a predetermined period of time from the transmission of the multicast frame.

13. The wireless communication system according to claim 9, wherein
the multicast frame includes an address of each of a plurality of target wireless communication receiving devices.

14. The wireless communication system according to claim 9, wherein
the target receiving devices are all of the wireless communication receiving devices of the wireless communication system.

15. The wireless communication system according to claim 9, wherein the controller is further configured to cause the unicast frame including the distribution data and the return request to be transmitted from one of the antennas.

16. The wireless communication system according to claim 15, wherein
when the intensity of the return frames meets the predetermined condition, the controller causes a plurality of unicast frames to be transmitted sequentially to each of receiving devices that returned a negative acknowledgement within the return frame.

17. A method for wirelessly distributing data from a wireless communication device to a plurality of receiving devices, comprising:
transmitting a multicast frame including distribution data and a return request to the plurality of receiving devices;
when a predetermined amount of time has elapsed from the transmission of the multicast frame, determining an intensity of one or more return frames received from the receiving devices as a response to the multicast frame;
when the intensity of the return frames meets a predetermined condition, re-transmitting the multicast frame to the plurality of receiving devices; and when the intensity of the return frames does not meet the predetermined condition, transmitting a unicast frame including the distribution data, the return request and an address of a single target receiving device to each of one or more receiving devices that returned a negative acknowledgement within the return frame.

* * * * *